Patented Jan. 7, 1936

2,026,873

UNITED STATES PATENT OFFICE 2,026,873

METHOD FOR SOFTENING BLEACHED AND DYED RUSCUS

John M. Dux, Jacksonville, Fla.

No Drawing. Application October 2, 1934, Serial No. 746,625

19 Claims. (Cl. 99—1)

This invention relates to a process for softening dyed ruscus, and is quite effective in those cases where the ruscus has been preliminarily bleached, or perhaps bleached and subsequently dyed. Dyed ruscus has a comparatively widespread market, its principal drawback however being that ordinarily this dyed ruscus is stiff, brittle, and unnatural in appearance. By my new process this drawback is avoided, and the soft, life-like appearance is restored.

My invention also relates to a type of composition capable of producing the desired softening action, and to a method of producing such composition.

I rely particularly on an emulsified solution of glycerine and water-soluble sulphonated vegetable oils for bringing about the desired softening action, the ruscus preferably being submerged therein. The process has been found to be improved by the gentle application of heat. The undesirability of the stiffness of dyed ruscus has long been appreciated in the art, and many attempts have been made to soften the ruscus. Glycerine has been found to soften the ruscus, but its use was found not to be successful since the glycerine apparently broke down under the action of light, and produced undesirable discoloration. The water-soluble sulphonated vegetable oils which I employ seem to exercise a stabilizing action on the glycerine and in any event, the use of such oils in my process is characterized by the fastness and uniformity of coloration.

With the said water-soluble sulphonated vegetable oils I preferably combine a vegetable gum, which serves two purposes. Firstly, the gum co-operates with the glycerine to keep the ruscus soft in that it prevents the glycerine from drying out in extremely dry weather. Thus, the ruscus does not become brittle. Secondly, the vegetable gum counteracts the tendency of the glycerine to render the ruscus translucent, so that the treated product possesses its original opacity.

In a general, but typical, example I submerge the plant or plants to be treated for from two to five minutes in an emulsified solution of water-soluble sulphonated vegetable oil, glycerine, and vegetable gums at a temperature ranging from approximately 90° to approximately 100° F., the plant thereafter being dried by suitable conventional means, as by the use of a hot room.

Where desirable I employ benzoate of soda in my compound in the approximate ratio of ½ ounce to every gallon of liquid, in order to keep the ruscus from moulding while it is being retained in closed containers.

A typical solution according to my invention, and from which the general proportions may be ascertained, is as follows:—

5 gallons of water
5 pounds of glycerine
2½ oz. vegetable gum
2½ oz. benzoate of soda
5 oz. water-soluble sulphonated vegetable oil.

To these ingredients I preferably, but not necessarily, add a small amount of acetimide and a small quantity of magnesium sulphate, the last two elements being used to preserve the ruscus and to prevent decay.

By the term "vegetable gums" I mean such products as for example, senegal, ghatti, karaya, locust gum, and the like.

A second typical example of solution is the following:—

1 gallon water, sufficient glycerine to bring the density to 5° Baumé, about 1 oz. vegetable gums, about 1 oz. water-soluble sulphonated vegetable oils, about 2 oz. of acetimide, about ½ oz. benzoate of soda.

To these ingredients I preferably but not necessarily, add a small quantity of magnesium sulphate.

I have found that the preferable, but not the only, method of compounding the solution is to dissolve the gum in the water, add the glycerine until the proper density is obtained, and then add the vegetable oil and other materials, if any.

I have found that bleached and dyed ruscus softened in the above manner will not change in color, but will be soft and flexible, and fast in color throughout the duration of the use of the ruscus. The plant itself will retain its softness and flexibility indefinitely. At the same time it is glossy and has the appearance of fresh and natural foliage.

The product is firm, yet flexible and soft at the same time, with no tendency to disintegrate. Since the dyes will not fade due to the softening treatment, it will, if for example it is dyed the typical Christmas red, retain its fiery red shade without fading, or without turning brown and dark with age.

It is evident that once the broad aspects of my invention are disclosed, many adaptations and modifications will readily occur to those skilled in the art, falling within the spirit thereof. Accordingly, I desire to be limited only by the scope of the appended claims.

I claim:—

1. The method of softening dyed ruscus, comprising immersing the same in an emulsified solution of glycerine and water-soluble sulphonated vegetable oils.

2. The method of softening dyed ruscus, comprising submerging the same in an emulsified solution of water-soluble sulphonated vegetable oils, glycerine, and vegetable gums, and subsequently drying.

3. The method of softening dyed ruscus, comprising submerging the same in an emulsified solution of water-soluble sulphonated vegetable oils, glycerine, and vegetable gums, in the presence of heat, and subsequently drying.

4. The method of softening dyed ruscus, comprising submerging the same in an emulsified solution of water-soluble sulphonated vegetable oils, glycerine, and vegetable gums, at temperatures ranging from approximately 90° to 100° F.

5. The method of softening dyed ruscus, comprising submerging the same for from 2 to 5 minutes in an emulsified solution of water-soluble sulphonated vegetable oils, glycerine, and vegetable gums, at temperatures ranging from approximately 90° to 100° F.

6. The method of softening dyed ruscus, comprising submerging the same in an emulsified solution of the following ingredients and approximate proportions:—5 gallons water, about 5 pounds of glycerine, 2½ ounces vegetable gum, 5 ounces water-soluble sulphonated vegetable oil, 2½ ounces benzoate of soda, and subsequently drying it.

7. The method of softening dyed ruscus, comprising submerging the same in an emulsified solution of the following ingredients and approximate proportions:—5 gallons water, about 5 pounds of glycerine, 2½ ounces vegetable gum, 5 ounces of water-soluble sulphonted vegetable oil, 2½ ounces benzoate of soda, a small amount of acetimide, and a small amount of magnesium sulphate, and subsequently drying it.

8. The method of softening dyed ruscus, comprising submerging the same in an emulsified solution of the following ingredients and approximate proportions:—5 gallons water, about 5 pounds of glycerine, 2½ ounces of a gum of the group consisting of senegal, ghatti, karaya, and locust gum, 5 ounces water-soluble sulphonated vegetable oil, and subsequently drying it.

9. The method of softening dyed ruscus, comprising submerging the same in an emulsified solution of the following ingredients and approximate proportions:—5 gallons water, about 5 pounds of glycerine, 2½ ounces of gum of the group consisting of senegal, ghatti, karaya, and locust gum, 5 ounces water-soluble sulphonated vegetable oil, 2½ ounces benzoate of soda, a small amount of magnesium sulphate, and a small amount of acetimide, and subsequently drying it.

10. The method of softening dyed ruscus, comprising submerging the same in an emulsified solution of the following ingredients and approximate proportions:—1 gallon water, glycerine sufficient to bring the solution to 5° Baumé, about 1 ounce vegetable gum, about 1 ounce water-soluble sulphonated vegetable oil, and subsequently drying it.

11. The method of softening dyed ruscus, comprising submerging the same in an emulsified solution of the following ingredients and approximate proportions:—1 gallon water, glycerine sufficient to bring the solution to 5° Baumé, about 1 ounce vegetabe gum, about ½ ounce benzoate of soda, about 1 ounce water-soluble sulphonated vegetable oil, about 2 ounces acetimide, and a small amount of magnesium sulphate, and subsequently drying it.

12. The method of softening dyed ruscus, comprising submerging the same in an emulsified solution of the following ingredients and approximate proportions:—5 gallons water, about 5 pounds of glycerine, 2½ ounces vegetable gum, 5 ounces water-soluble sulphonated vegetable oil, for from about 2 to 5 minutes at a temperature of from approximately 90 to 100° F., and subsequently drying it.

13. The method of softening dyed ruscus, comprising submerging the same in an emulsified solution of the following ingredients and approximate proportions:—1 gallon water, glycerine sufficient to bring the solution to 5° Baumé, about 1 ounce vegetable gum, about ½ ounce benzoate of soda, about 1 ounce water-soluble sulphonated vegetable oil, and a small amount of magnesium sulphate, for from about 2 to 5 minutes at a temperature of from approximately 90 to 100° F., and subsequently drying it.

14. A composition for softening dyed ruscus, comprising an emulsified solution of a water-soluble sulphonated vegetable oil, glycerine, and a vegetable gum.

15. A composition for softening dyed ruscus, comprising an emulsified solution of the following ingredients and approximate proportions:—5 gallons water, about 5 pounds of glycerine, 2½ ounces vegetable gum, 5 ounces water-soluble sulphonated vegetable oil.

16. A composition for softening dyed ruscus, comprising an emulsified solution of the following ingredients and approximate proportions:—5 gallons water, about 5 pounds of glycerine, 2½ ounces vegetable gum, 5 ounces water-soluble sulphonated vegetable oil, 2½ ounces benzoate of soda, a small amount of acetimide, and a small quantity of magnesium sulphate.

17. A composition for softening dyed ruscus, comprising an emulsified solution of the following ingredients and approximate proportions:—1 gallon water, sufficient glycerine to bring solution to 5 degrees Baumé, about 1 ounce vegetable gum, about 1 ounce of water-soluble sulphonated vegetable oil, about ½ ounce benzoate of soda, about 2 ounces of acetimide.

18. A composition for softening dyed ruscus, comprising an emulsified solution of the following ingredients and approximate proportions:—1 gallon water, sufficient glycerine to bring solution to 5 degrees Baumé, about 1 ounce vegetable gum, about 1 ounce of water-soluble sulphonated vegetable oil, about ½ ounce benzoate of soda, about 2 ounces of acetimide, and a small quantity of magnesium sulphate.

19. The method of producing a composition for softening dyed ruscus, comprising, in the approximate proportions given, dissolving about 1 ounce vegetable gum in a gallon of water, then adding glycerine until a density of 5° Baumé is reached, and thereafter adding about 2 ounces of water-soluble sulphonated vegetable oil.

JOHN M. DUX. [L. S.]